(12) United States Patent
Fisher et al.

(10) Patent No.: US 7,009,964 B2
(45) Date of Patent: Mar. 7, 2006

(54) ROTATOR SWITCH DATA PATH STRUCTURES

(75) Inventors: David Anthony Fisher, Kanata (CA); Michel Langevin, Nepean (CA)

(73) Assignee: Nortel Networks Limited, Montreal (CA)

( * ) Notice: Subject to any disclaimer, the term of this patent is extended or adjusted under 35 U.S.C. 154(b) by 657 days.

(21) Appl. No.: 09/971,011

(22) Filed: Oct. 5, 2001

(65) Prior Publication Data

US 2002/0039362 A1 Apr. 4, 2002

Related U.S. Application Data

(63) Continuation of application No. 09/057,525, filed on Apr. 9, 1998, now Pat. No. 6,307,852.

(51) Int. Cl.
*H04Q 11/00* (2006.01)

(52) U.S. Cl. .................................... 370/363; 370/357

(58) Field of Classification Search ........ 370/229–235, 370/412–429, 351–386, 388, 395, 398, 341; 340/2.2, 2.26, 2.28

See application file for complete search history.

(56) References Cited

U.S. PATENT DOCUMENTS

| | | | | | |
|---|---|---|---|---|---|
| 4,905,226 | A | * | 2/1990 | Kobayashi | 370/378 |
| 5,168,492 | A | * | 12/1992 | Beshai et al. | 370/353 |
| 5,544,168 | A | * | 8/1996 | Jeffrey et al. | 370/391 |
| 5,712,854 | A | * | 1/1998 | Dieudonne et al. | 370/536 |
| 5,745,486 | A | * | 4/1998 | Beshai et al. | 370/395.71 |
| 5,821,875 | A | * | 10/1998 | Lee et al. | 340/2.21 |

* cited by examiner

*Primary Examiner*—Dang Ton
*Assistant Examiner*—Phuc Tran

(57) ABSTRACT

Several rotator switch architectures are provided that enhance performance of a basic rotator switch. The rotator switches having double buffered tandem nodes, multiplexing two or more sources onto each tandem node, partitioning the rotator into two or more parallel space switches, two or more rotator planes multiplexing from/to source and destination nodes to provide data path redundancy, priority queueing on source nodes scheduled locally or globally, or redundancy in the schedulers are shown.

19 Claims, 7 Drawing Sheets

Each tandem has two RAM-banks with write & read
Alternating between banks once per rotation

ROTATOR SWITCH DATA PATH STRUCTURES

This application is CON of Ser. No. 09/057,525 now U.S. Pat. No. 6,307,852

FIELD OF THE INVENTION

The present invention relates to rotator switches and is particularly concerned with data path structures.

BACKGROUND TO THE INVENTION

The rotator is a form of buffered space switch in which connections between a set of sources and destinations are made though a set of tandems each containing buffer memory, the tandems are connected in rotation to each source, and in rotation to each destination. In the most basic form of the rotator, there are equal numbers of source, destination and tandem nodes, and rotation of connections is achieved by means of a space switch between the tandem and source and between the tandem and destination nodes. The bandwidth of each interconnecting link used to form a commutated paths through the space switch, is made equal to or with dilation made greater than the input rate of each source or equally the output rate of any destination.

In the rotator described in prior art which will be referred to as the original rotator, during each phase of the cycle, K information units (IU)-are transferred from the tandem to each destination, and K IUs are transferred from each source to each tandem. The basis of operation ensured by the scheduling or collision avoidance matching process is that at any time the tandem can be assigned a maximum of only K IUs for any given destination. For the purposes of this document and without loss of generality of the enhancements, the value of K will be set to one information unit for both the original rotator and the enhanced rotator. The number of sources, destinations, and tandems are represented by s, d, and t, respectively. Thus in general for K=1 for the original rotator, the tandem will have s=d IU storage locations, which are read out in the sequence shown in the table.

| Cycle | Phase | Source 0 connects to tandem # | Source1 connects to tandem # | Source 2 connects to tandem # | Source 3 connects to tandem # |
|---|---|---|---|---|---|
| 0 | 0 | 0 | 3 | 2 | 1 |
| 0 | 1 | 1 | 0 | 3 | 2 |
| 0 | 2 | 2 | 1 | 0 | 3 |
| 0 | 3 | 3 | 2 | 1 | 0 |
| 1 | 0 | 0 | 3 | 2 | 1 |
| 1 | 1 | 1 | 0 | 3 | 2 |
| 1 | 2 | 2 | 1 | 0 | 3 |
| 1 | 3 | 3 | 2 | 1 | 0 |

Since all tandems visit all destinations, in the simplest matching process, any source may place an IU on any tandem not already having an IU for that destination. In implementation this means that the address in the RAM to which an IU is placed is equivalent to the destination identity and this may be passed to tandem as a parameter with, or in advance of the IU requiring a label of length $\log_2(d)$ bits. The addressing of read out for transfer to the destination simply follows the connection sequence and may employ a simple modulo d counter incremented at every phase of the rotation.

If one tandem is considered in isolation it can be seen that in s=d=t phases it provides each destination with one IU and that this IU can come from any one of the s sources. For any given rotation, sources are mutually exclusive (i.e., two IUs cannot come from the same source and go to different destinations in the simple original rotator). Thus, viewed independently, each tandem provides connectivity directly equivalent to that of a space switch except that the connection between the sources and destinations is spread out (sheared) in time over the period of one rotation (*note 1). Given there are s tandems and s phases per rotation, instead of being equivalent to one re-configuration of a an s by s space switch per rotation, the total effect is equivalent to one reconfiguration of an s by s space switch per phase, one phase step being the time it takes to transfer one IU.

*Note 1: There is one other constraint in terms of the original rotator, this is that each decision on allocation to a tandem is dependent on the previous 3 allocation decisions, a constraint in the form of a moving window.

SUMMARY OF THE INVENTION

A known commutator-based switch comprises a plurality of source nodes, a plurality of intermediate memory devices, a plurality of destination nodes, a first commutator cyclically connecting the source nodes to the intermediate memory devices, and a second commutator cyclically connecting the intermediate memory devices to the destination nodes. A systematic delay in the intermediate memory device has an upper bound that is proportianal to the number of intermediate memory devices. The method and apparatus of the present invention reduces the systematic delay by providing intermediate memory devices of a significantly higher speed in comparison with the speed of the source nodes and destination nodes.

In accordance with one aspect of the present invention, there is provided a switch comprising: a first commutator cyclically connecting each source node from among a first number of source nodes to each intermediate memory device from among a second number of independent intermediate memory devices; and a second commutator cyclically connecting the each intermediate memory device to each output port from among a third number of second commutator output ports. At least one of the first commutator input ports is time-shared by at least two source nodes from among the first number of source nodes. In one realization, the outputs of the at least two source nodes are multiplexed and offered to an input port of the first commutator.

In accordance with another aspect of the present invention, there is provided a method of switching comprising: cyclically connecting at least one source node, from among a plurality of source nodes, to a specific input port of a first commutator having a plurality of input ports; cyclically connecting the specific input port to each intermediate memory device from among a plurality of intermediate memory devices; and cyclically connecting the each intermediate device to output ports of a second commutator having a plurality of second commutator output ports; thereby permitting the use of a number of source nodes exceeding the number of intermediate memory devices.

In accordance with a further aspect of the present invention, there is provided a switch comprising: a plurality of input commutators each input commutator associated with a respective plurality of source nodes and cyclically connecting each source node from among the respective plurality of source nodes to respective output ports of the each input commutator; a plurality of intermediate memory devices each connecting to an output port from each input commutator of the plurality of input commutators; and a plurality of output commutators each output commutator associated with a respective plurality of destination nodes and cyclically connecting each intermediate memory device from among the plurality of intermediate memory devices to a destination node from among the respective plurality of destination nodes associated with each of the output commutators. The plurality of intermediate memory devices is shared by the plurality of input commutators and the plurality of output commutators.

BRIEF DESCRIPTION OF THE DRAWINGS

The present invention will be further understood from the following detailed description, with reference to the drawings in which.

DETAILED DESCRIPTION

Figure 1:
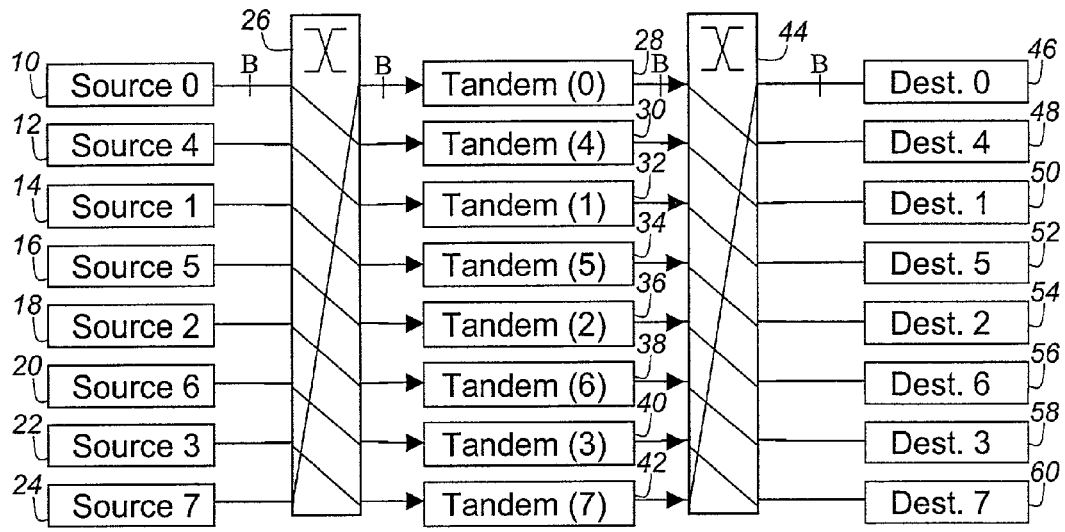
FIG. 1 illustrates a known rotator switch for transferring data in information units.
Figure 1:
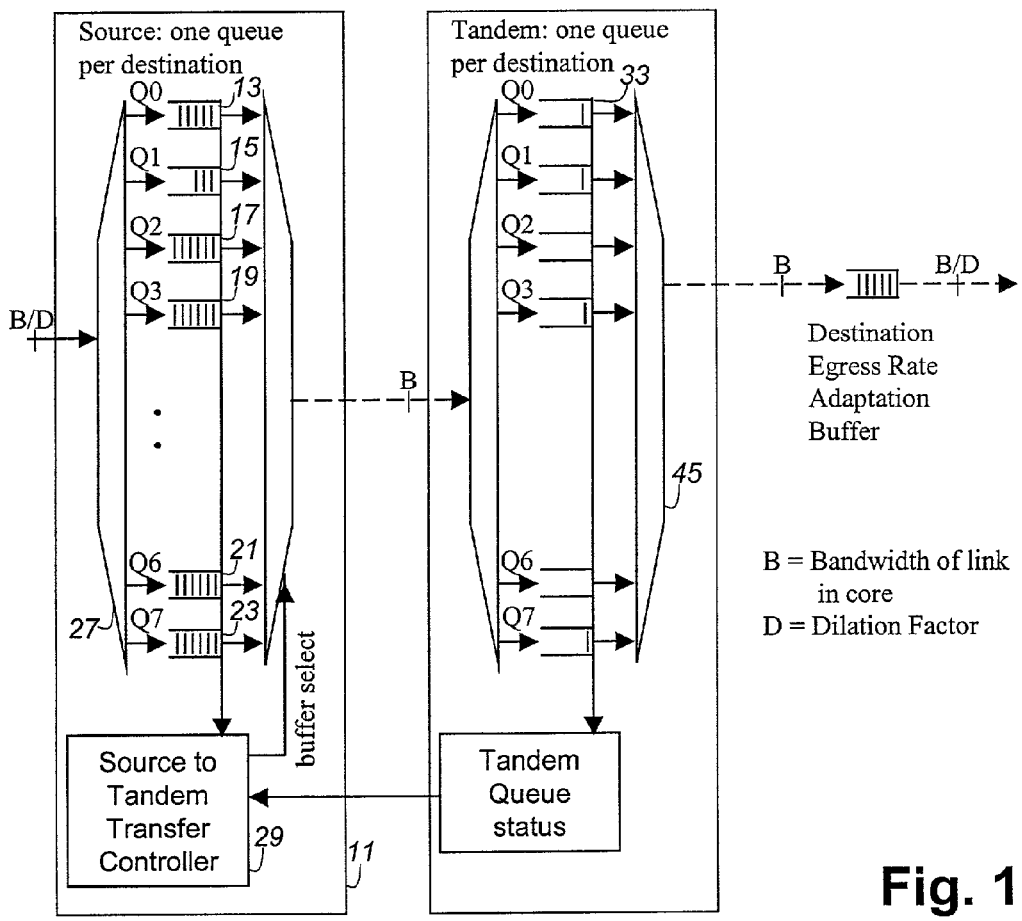

Referring to FIG. 1 there is illustrated a known rotator switch for transferring data in information units. The rotator switch includes eight input (source) nodes 10–24, a first commutator 26, eight intermediate nodes (tandems) 28–42, a second commutator 44 and eight output (destination) nodes 46–60. Each commutator 26 and 44 is a specific space-switch in which the connection matrix status is restricted to follow a predefined pattern that mimics a rotation scheme. Each source node (10, 12, 14, 16, 18, 20, 22, 24) shown expanded as 11 comprises means of allocating an incoming data unit (27) to the queue corresponding to the destination of that data unit for example Q0 (13) being for IUs for transfer to destination 0 (46).

In operation, IUs are queued in the source nodes, waiting for space on a tandem via which they are transported to a destination node. Known rotator switches base scheduling of the spaces on the tandems dependent upon the occupancy of a queue in the source node for a particular destination, and if for a particular tandem for more than one destination a space is available and matches the source demand as determined by the corresponding source queue occupancy, a local decision is made between which IU to transfer from the source to the tandem depending on parameters representing queueing time (age) of information units, queue size or priority. Once an information unit is—transferred to the tandem, the rotator switch of FIG. 1 has fixed a component of delay between a particular source—destination pair dependent on the number of steps or phases of rotation between the source being connected to the tandem and subsequent connection of the tandem to the destination. The tandems (28, 30, 32, 34, 36, 38, 40 and 42) shown expanded as 31 include means of allocating IUs to the appropriate buffer corresponding with the destination such that Q0 (33) stores IUs for destination 0 (46) and so forth, there being a predefined number of information units stored by each tandem buffer corresponding to the number that can be unloaded completely during the connection of that tandem to that destination which for the purposes of this explanation without loss of generality will be set to one. The maximum delay corresponds to one rotation and in the known rotator and will increase linearly in proportion to the number of nodes.

An example of the known rotator switch of FIG. 1 provides an 8×8 fabric by using two 8×8 space switches of link bandwidth B and eight tandems of bandwidth B. Memory per tandem is 8 IUs with a total memory requirement of 64 IUs. Rotation time is 8IUs.

Figure 2:
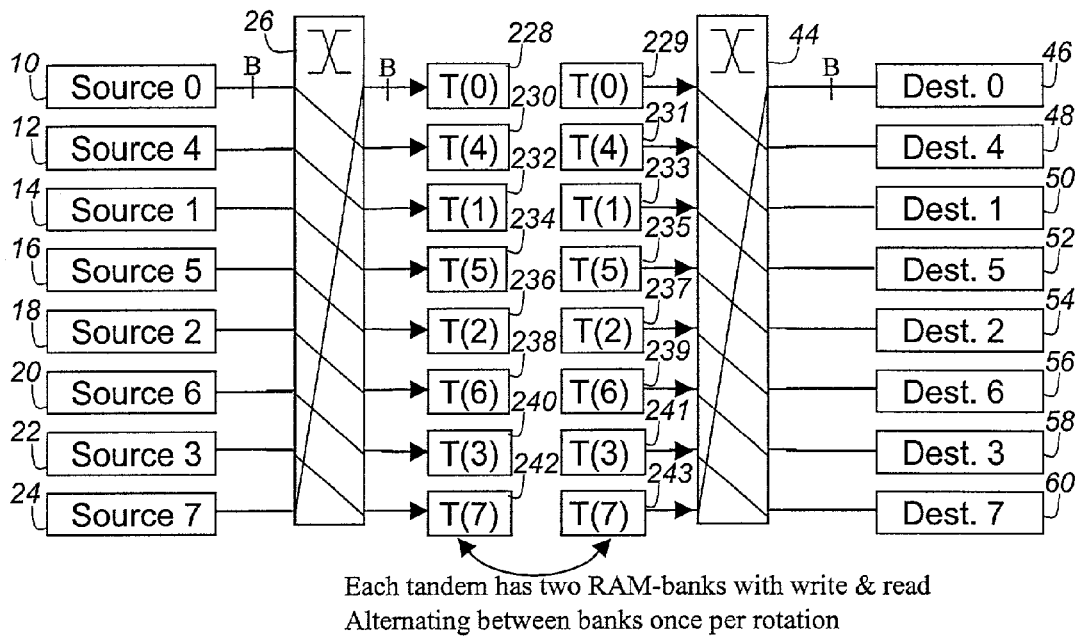
FIG. 2 illustrates a rotator switch for transferring data in information units in accordance with a first embodiment of the present invention including double buffered tandems.
Figure 2:
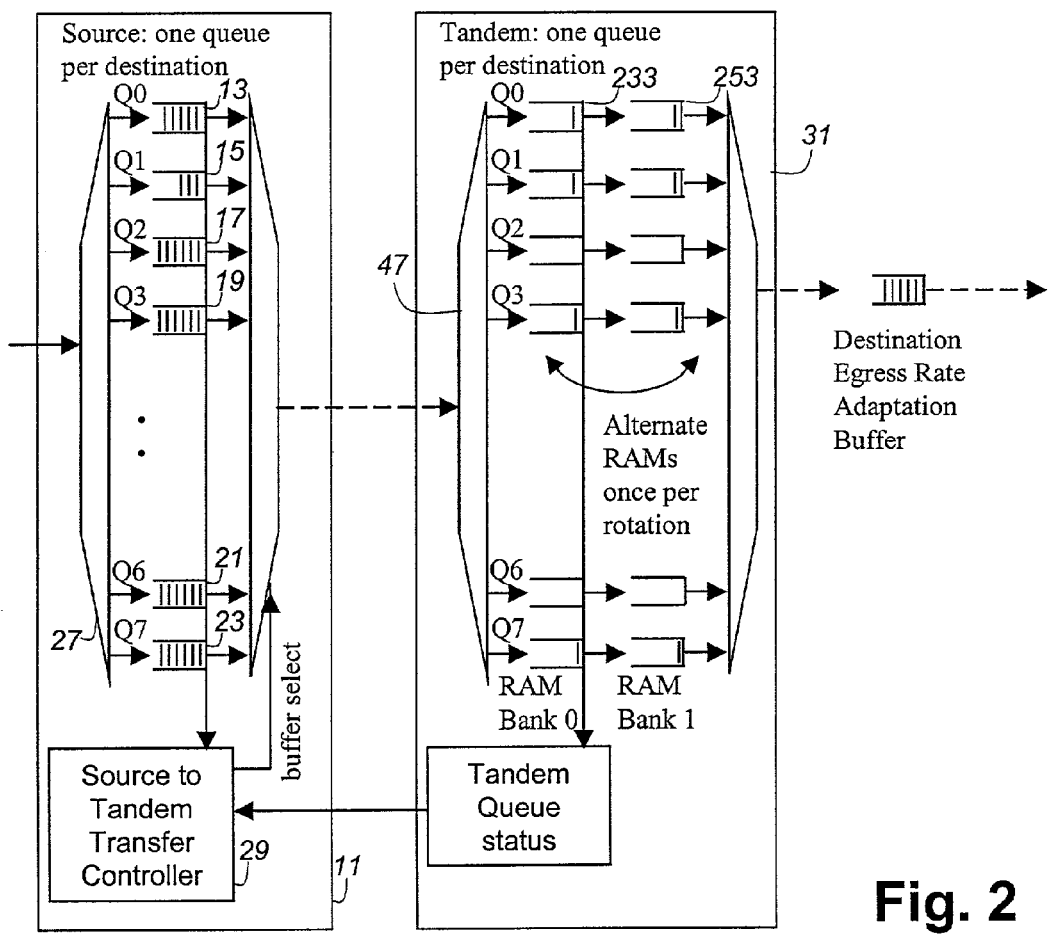

Referring to FIG. 2, there is illustrated a rotator switch for transferring data in information units in accordance with a first embodiment of the present invention. In this extension of the known rotator, the tandem memory is logically split into two banks 0 and 1, as depicted by the two columns, bank 0 including tandem memories 228, 230, 232, 234, 236, 238, 240, 242, bank 1 including tandem memories 229, 231, 233, 235, 237, 239, 241, 243. Each bank comprising means for allocating the arriving data unit (47) to the appropriate location in memory determined for example by a label in the data unit used to identify the root of an address of the IU storage location in a random access memory, one storage location being allocated for each destination queue in each bank for example Q0 (233) corresponding in bank 0 to the storage location of IUs enroute to destination 0.

In operation, bank 0 is being filled by IU's from the sources for one rotation while bank 1 is being emptied into the destinations, whereas in the next rotation, bank 0 is being emptied into the destinations and bank 1 being filled by the sources. The reason for this partitioning is to provide additional degrees of freedom in the scheduling process, comprising that process in which the decision is made as to which destination an information unit from a source can be stored within the tandem. The extension of scheduling methods to include destination based scheduling is defined in our copending patent application entitled "SCHEDULING METHOD FOR INPUT-BUFFER SWITCH ARCHITECTURE" filed the same day as the present application and assigned to the same assignee.

In the case of the known rotator of FIG. 1a, scheduling is accomplished by comparing the availability of destination queues in the tandem. For simplicity of explanation herein and without loss of generality only the case of at most one IU per destination is considered. In the known rotator of FIG. 1, without double buffering, the tandem node destination buffers are unloaded one by one in each phase of the rotation as they pass each destination providing one by one free buffers for the destination just visited. In the case where there is contention for a particular destination between two IUs from separate sources the condition can occur whereby the first source after the destination will always seize the tandem buffer to said destination, such that a source between the first source and the destination always sees the buffer memory for that destination as occupied.

By contrast, in the embodiment of FIG. 2, with double buffering, the tandem memory is swapped at a particular point in the rotation such that after this point all destination buffers in the ingress bank of the tandem memory are free and consequently the first source to be connected to that tandem has access to any destination. If for each tandem the memory banks are swapped at a different point in the rotation cycle, then if there are as many tandems as sources, each source will have at least one opportunity in the cycle to send an IU to any destination, thus having the desirable benefit of removing bias from this simple scheduling process that will be referred to as source based scheduling to distinguish it from destination based scheduling as described in our copending application referenced herein above.

Double buffering using the known step by step source based matching process however has the side effect that, if each tandem memory bank is swapped at a different place in the cycle, the transfer time between a particular source and the destination will become dependent on which tandem is used because if the swapping occurs as the tandem is rotated between the source and destination node there will be a delay of less than one rotation, whereas if the swapping occurs after the destination has passed by the tandem there will be one rotation of additional delay. Thus, with the embodiment of FIG. 2 that includes double buffering and tandem memory swapping, unless all memory swaps occur at the same point in the cycle for all tandems, it becomes necessary to add a delay equal to one rotation to all paths in which the tandem memory swap occurs between the source and destination. One method of delay equalization is to employ a ring buffer of size equal to the number of IUs received in one rotation, in which an IU output from the tandem requiring a delay of one cycle is written into the ring buffer whereas an IU that requires no delay bypasses the ring buffer and is used directly. Each phase the write and read pointer to the ring buffer is advanced and the scheduling method as described ensures there cannot simultaneously be an arrival for immediate use if there is already an IU available to read at the same time from the ring buffer.

A more efficient alternative is to employ a scheduler in which the swap time is considered to be the same absolute time for all tandems (equivalent to the position in the rotation being evenly distributed) is thereby gaining the bias reduction advantages of the double buffered tandem, but to employ for the data path the scheme in which tandem RAM banks swap at a fixed point in the rotation cycle thus eliminating the need for delay equalization buffering procedure. This method can be employed either for source based scheduling or destination based scheduling by employing a reservation system summarized earlier as the sixth embodiment of the present invention, in which the matching process is performed ahead of and separate from the data transfer rotation cycle such that the periodic emptying of the tandem buffer once per rotation and allocation of reservations one or more rotation cycles ahead of the data transfer allows the order of considering sources to be allocated to a particular tandem and corresponding allocation of grants to be made in any order desired although the transfer of actual data follows strictly the order of source to tandem connection as defined, such that provided all tandem memories are swapped at the same position in the cycle in respect of a source, there will be no systematic misordering of information flowing from a source node to a data node independent of the tandem used in transit. A similar method applied to the destination based scheduler is explained in full in our copending application referenced herein above.

Figure 3:
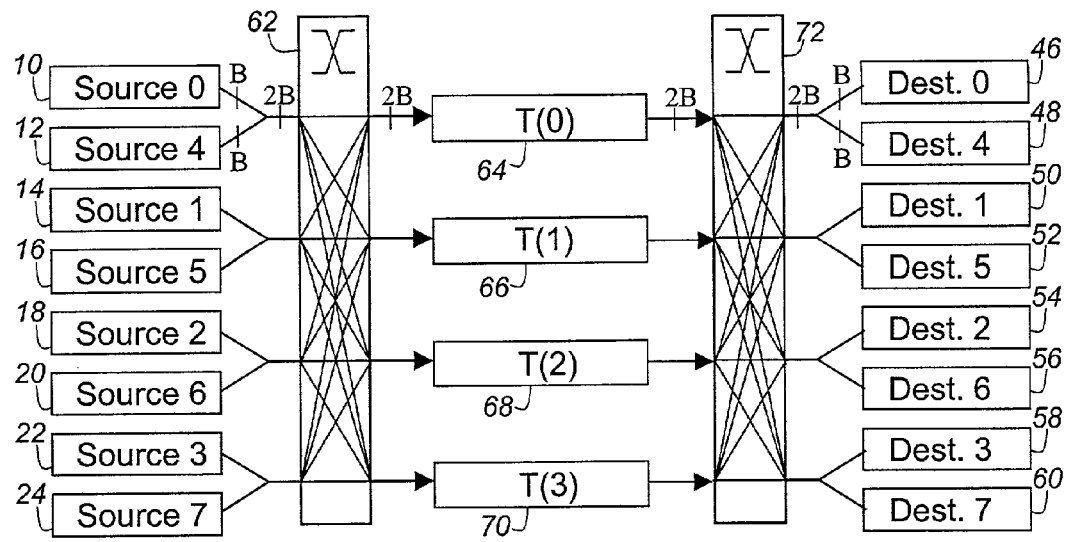
FIG. 3 illustrates a rotator switch for transferring data in information units in accordance with a second embodiment of the present invention including concurrent multiplexing of two or more sources and destinations onto one tandem.

Referring to FIG. 3 there is illustrated a rotator switch for transferring data in information units in accordance with a second embodiment of the present invention. The rotator switch example includes eight source nodes 10–24, a first commutator 62, four tandems 64–70, a second commutator 72 and eight destination nodes 46–60. Pairs of source nodes, for example source 0, 10 and source 4, 12, have their outputs multiplexed together before inputting to the first commutator 62. Similarly, pairs of destination nodes, for example, destination 0, 46 and destination 4, 48, have their inputs connected, after demultiplexing, to the outputs from the second commutator 72.

In operation, cells are queued in the source nodes, as in the known rotator switch, waiting for space on a tandem via which they are transported to a destination node. However because the outputs of pairs of source nodes are multiplexed together, the number of commutator ports and the number of tandems can be halved while doubling bandwidth of individual links through the commutator and doubling the bandwidth of the tandems. This has the benefit of reducing the rotation time by one-half by virtue of halving the number of tandems which additionally halves the total memory requirement in the rotator data path. This process of multiplexing more than one source and destination onto a tandem can be continued to advantage until the limit of the tandem memory bandwidth is reached which in general will be several times higher than the source memory bandwidth due to the strictly limited length of the tandem queues being one per destination in this example, eliminating queue management in the tandem allowing in a practical embodiment a fast wide static random access memory contained within an integrated circuit.

An example of the embodiment of FIG. 3 provides an 8×8 fabric by using two 4×4 space switches of link bandwidth 2B and four tandems of bandwidth 2B. Memory per tandem is 8 IUs for a total memory requirement of 32 IUs. Rotation time is 4 IUs.

In respect of scheduling using the known rotator source to tandem demand to availability matching method, this may be extended to take account of two or more sources competing for the destination buffers within a tandem by considering each source to be connected to the tandem in series for the purpose of allocating an IU to the tandem from each, logically equivalent in scheduling terms to the eight tandem rotator. An enhancement is to alternate the order of access to the tandem between the two sources so as to minimise bias. The destination based scheduling described in the above referenced copending patent application, can also treat pairs of concurrent sources as if serial for the purpose of scheduling.

Figure 4:
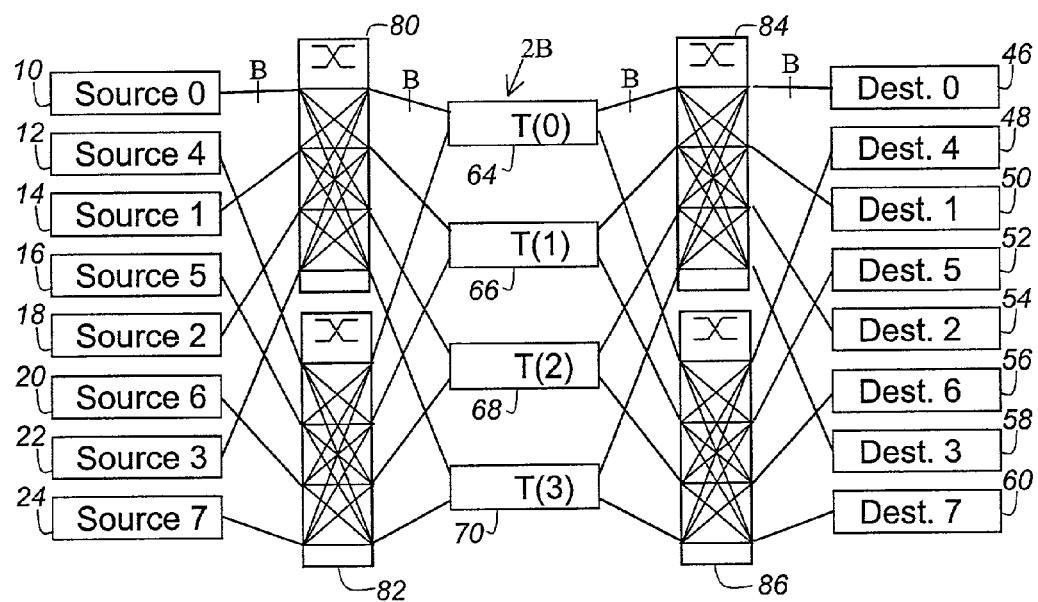
FIG. 4 illustrates a rotator switch for transferring data in information units in accordance with a third embodiment of the present invention including the two or more groups of sources and destinations and concurrently multiplexed onto one set group of tandems and including a separate space switch to provide the rotating connection function for each group.

Referring to FIG. 4 there is illustrated a rotator switch for transferring data in information units in accordance with a third embodiment of the present invention. The third embodiment represents a variation of the embodiment of FIG. 3 and is identical in respect of availability and timing of source to tandem and tandem to destination paths although topologically different. The rotator switch includes eight source nodes 10–24, a first commutator including a pair of switches 80 and 82, four tandems 64, 66, 68, 70, a second commutator including a second pair of switches 84 and 86 and eight destination nodes 46–60. Pairs of source nodes, for example source 0, 10 and source 4, 12, have their outputs connected respectively to the pair of switches 80 and 82 of first commutator. Similarly, pairs of destination nodes, for example, destination 0, 46 and destination 4, 48, have their outputs multiplexed together before inputting to the second commutator 72.

In operation, cells are queued in the source nodes, as in the embodiment of FIG. 3. however in contrast to embodiment of FIG. 3, the sources are split into two independent groups that are fed to two commutators each with half the number of ports and therefore half of the total bandwidth of those in FIG. 3. The output from these commutators is fed to the four tandems at which point the tandems in FIG. 4 receive exactly the same sequence of information as those of FIG. 3 receiving two IUs in parallel from each source for each step of the rotation. The advantage of this approach is the ability to partition the commutators into two physically independent blocks of lower bandwidth each of which may be co-located in the same physical housing while retaining the advantageous reduced rotation time and reduced total storage requirement of FIG. 3

An example of the embodiment of FIG. 4 provides an 8×8 fabric by using four 4×4 space switches of link bandwidth B and four tandems of bandwidth 2B. Memory per tandem is 8 IUs for a total memory requirement of 32 IUs. Rotation time is 4 IUs.

Figure 5:
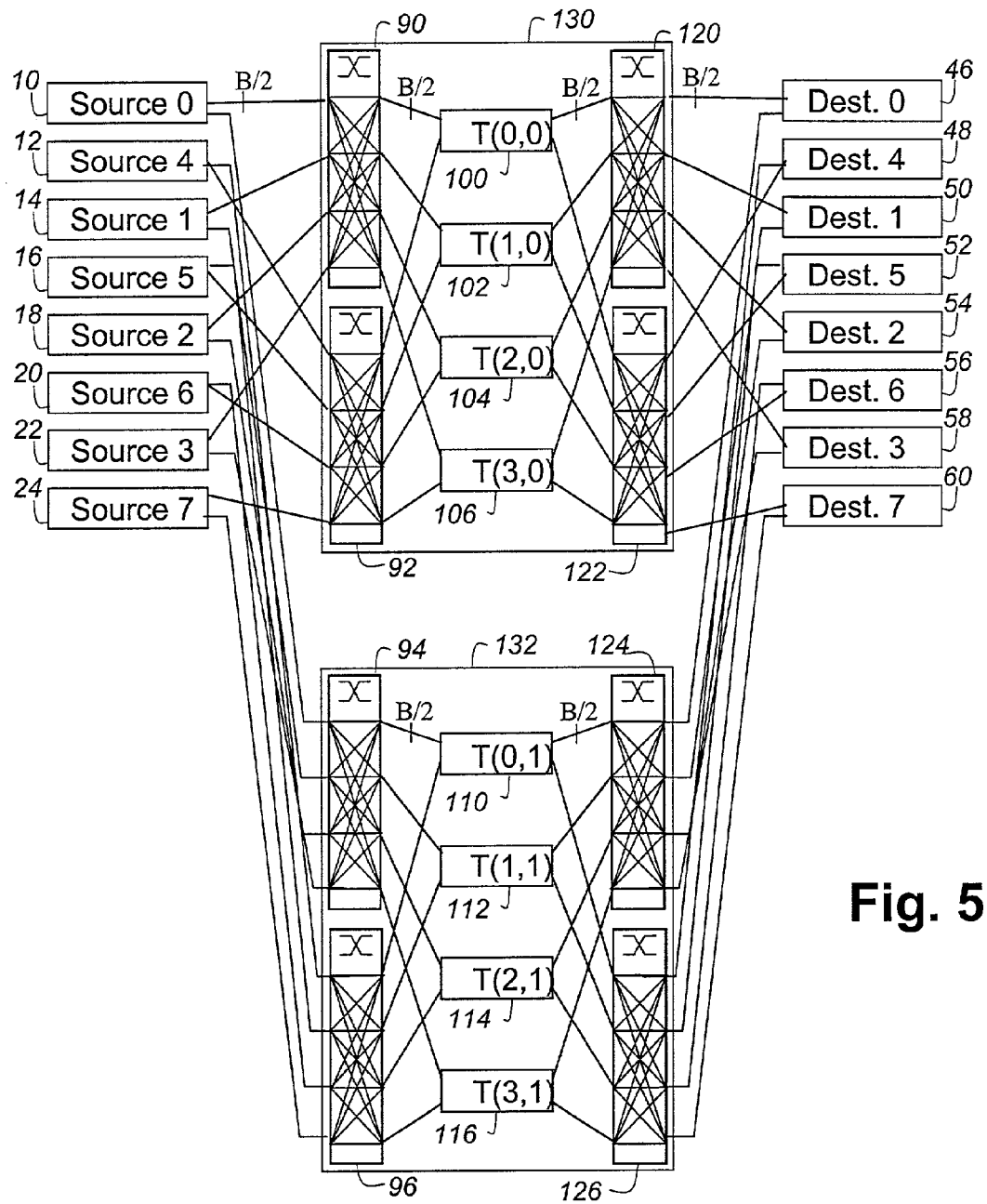
FIG. 5 illustrates a rotator switch for transferring data in information units in accordance with a fourth embodiment of the present invention including each source split across two or more rotator structures operating in parallel plane.

Referring to FIG. 5 there is illustrated a rotator switch for transferring data in information units in accordance with a fourth embodiment of the present invention. A further enhancement of the data path architecture is given by dividing the source bandwidth across several "rotators" and sending independent IUs from that source to the rotators in different planes. This is illustrated in the FIG. 5.

The rotator switch includes eight source nodes 10–24, a first commutator including four switches 90, 92, 94, and 96, four tandems each 100, 102, 104, 106 and 110, 112, 114, 116, a second commutator including four switches 120, 122, 124 and 126 and eight destination nodes 46–60. A first plane 130 is formed by the first two switches 90 and 92, of the first commutator, being connected to the first four tandems 100, 102, 104, and 106 which in turn are connected to the first two switches 120 and 122, of the second commutator. A second plane 132 is formed by the second two switches 94 and 96, of the first commutator, being connected to the second four tandems 110, 112, 114, and 116 which in turn are connected to the second two switches 124 and 126, of the second commutator. Each source node is connected to alternate pairs of switches. For example source 0, 10 has its outputs divided and connected respectively to the pair of switches 90 and 94 of first commutator. Similarly, pairs of destination nodes, for example, destination 0, 46 has two inputs from the commutators 120 and 124.

In operation, Source 0 is now able to send either (i) an IU to each of two rotators at half the rate of FIG. 4 or alternatively (ii) to send the first half of the IU to one rotator plane (130) and the second half to the second rotator plane (132). At any time the source is connected to the same tandem phase in the rotation cycle of either rotator (130 or 132). (By rotator is meant the combination of the space switches and the tandem functions). With approach (ii), the total bandwidth of the rotator based switch fabric is doubled without increasing the bandwidth of the individual tandems essentially using two data paths in parallel with the advantage that the rotation time is halved as with solution 3. Alternatively with approach (i), the source generates two complete and independent information units in parallel that are fed through the two rotators such that failure of one path results in loss of only a fraction of the switch capacity. The method of dividing one rotator into a multiplicity of smaller rotators by this means can be continued until the number of tandems is reduced to one either to increase the resilience to failure as in (i) or to reduce the rotation time by increased parallelism as in (ii). When the process of division results in just one tandem per rotator, then the rotation process can be entirely replaced at a cost of increase memory in the source, however the same scheduling methods can be applied as for the rotator as described herein and as in our copending patent referenced above.

An example of the embodiment of FIG. 5 provides an 8×8 fabric by using eight 4×4 space switches of link bandwidth B/2 and eight tandems of bandwidth B/2. Memory per tandem is 8 IUs for a total memory requirement of 64 IUs. Rotation time is 8 IUs.

Thus with K3planes, the failure of an entire plane only results in the loss of 1/K3of the total switch fabric capacity.

Each source is connected to a tandem in each plane simultaneously but for the purpose of the known scheduling method, the cycle of connection between the sources and the tandem can be considered as if the sources connect in sequence with the tandem. In the case (I), the source outputs operate in parallel into the two planes such that for each phase of the rotation the source provides an independent information unit into each plane at a bandwidth of B/2. However since the information units come from the same pool of queued information units in the source (unless the queues in the source are partitioned into planes on arrival as will be considered later), then each scheduling operation must take account of the allocation to each tandem to determine source queue occupancy. In this way the scheduling operation can be made to be serial as if the parallel planes and shared tandems comprised one large singular rotator. The above referenced copending patent application develops more advantageous solutions to this scheduling scenario.

Figure 6:
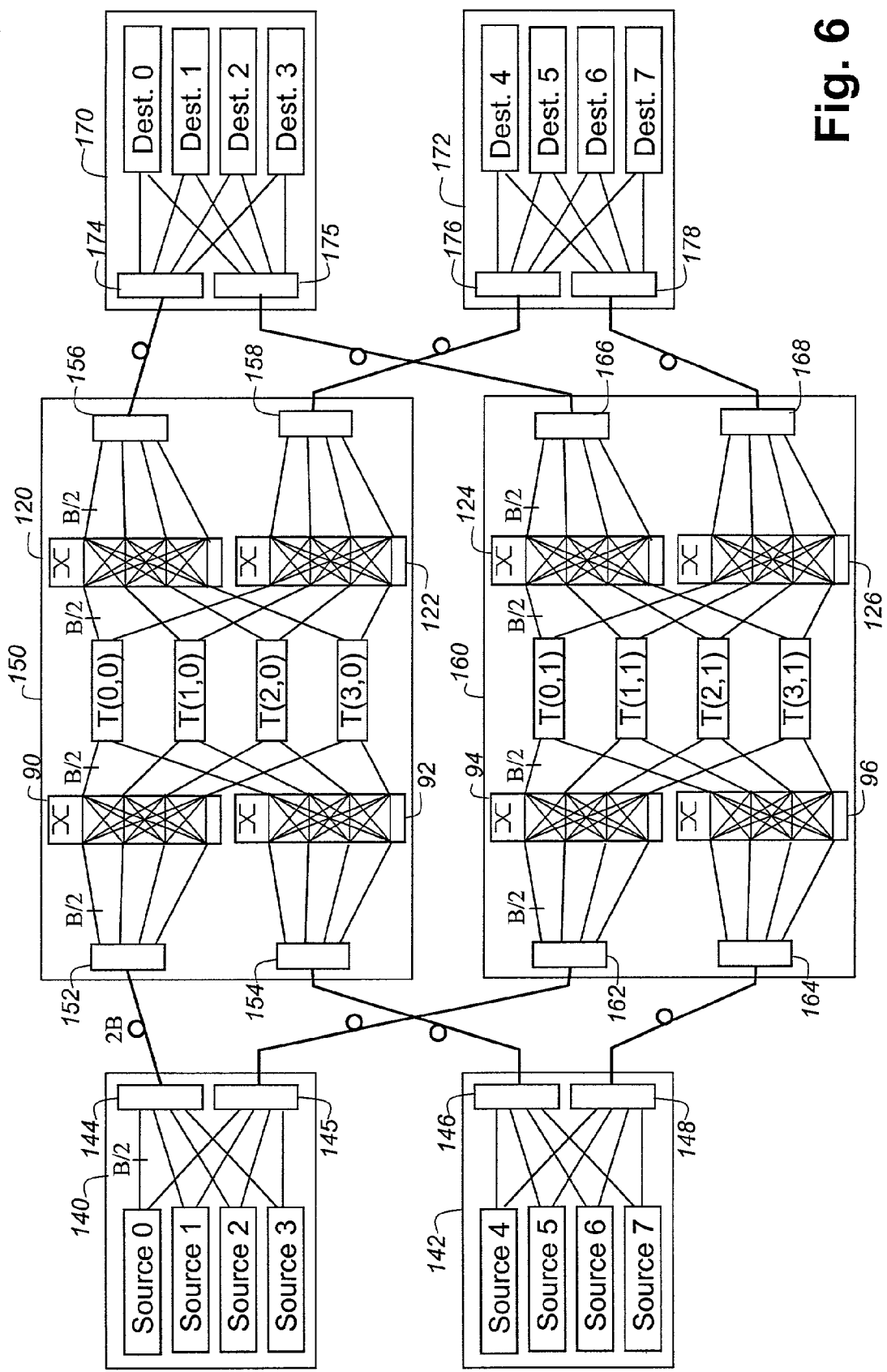
FIG. 6 illustrates a rotator switch for transferring data in information units in accordance with a fifth embodiment of the present invention including a method of physical partitioning of the rotator into two or more parallel planes and each plane is housed in a separate cabinet interconnected using fibre optics or similar high capacity medium.

If the sources and destinations are located separately from the tandems, then the connection between the sources and tandems in different planes can be multiplexed together into one or more high capacity optical links giving the physical partitioning illustrated by FIG. 6. In this case the sources have been separated into two distinct groups, each inverse multiplexed into planes, each plane coupled by (multiplexed optical) links to the rotator fabric.

Referring to FIG. 6 there is illustrated an implementation of the embodiment of FIG. 5. The implementation includes two source node modules 140 and 142, two switching modules 150 and 160 and two destination node modules 170 and 172. One source node module 140 includes source nodes 10, 14, 18 and 22 and multiplexers 144 and 145. Multiplexers 144 and 145 are connected to the outputs of each source node 10, 14, 18 and 22. The other source node module 142 includes source nodes 12, 16, 20, and 24 and multiplexers 146 and 148. Multiplexers 146 and 148 are connected to the outputs of each source node 12, 16, 20, 24.

The first switching module FIG. 6, 150 includes the first plane 130 of FIG. 5 formed by the first two switches 90 and 92, of the first commutator, the first four tandems 100, 102, 104, and 106 and the first two switches 120 and 122, of the second commutator. The first switching module also includes demultiplexors 152 and 154 and multiplexers 156 and 158. Demultiplexors 152 and 154 are linked to multiplexers 144 and 146.

The second switching module 160 (FIG. 6) includes the second plane 132 (of FIG. 5) formed by the second two switches 94 and 96, of the first commutator, the second four tandems 110, 112, 114, and 116 and the second two switches 124 and 126, of the second commutator. The second switching module 160 also includes demultiplexors 162 and 164 and multiplexers 166 and 168. Demultiplexors 162 and 164 are linked to multiplexers 145 and 148.

One destination node module 170 includes destination nodes 46, 50, 54 and 58 and demultiplexors 174 and 175. Demultiplexors 174 and 175 linked to multiplexors 156 and 166, respectively and are connected to the inputs of each destination node 46–50, 54, 58. The other destination node module 172 includes destination nodes 48, 52, 56, and 60 and demultiplexors 176 and 178. Demultiplexors 176 and 178 linked to multiplexors 158 and 168, respectively and are connected to the inputs of each destination node 48, 52, 56,–60. Note that the space switch (90, 92, 94, 96) of FIG. 6 can be further increased in dimension as required to allow as many optical inputs/DEMUX (152) as is practical to fit on a circuit card, such that a multiplicity of optical inputs via a multiplicity of opto-electric sub-units (152) can be connected to each commutator (90, 92, 94, 96) on input and the complementary function on output (120, 122, 124, 126) via a multiplicity of sub-units 156 and so forth. Thus many remote independent units of the form illustrated in FIG. 6 as 140 and 142 (and their corresponding complementary receive side (170 and 172) can be connected through optical (or logically equivalent links) to the same termination module as exemplified by 90 in each plane of the rotator and thus their traffic divided amongst all tandems within that plane rotation taking place within the unit 90, 92, 94 and 96. The objective is to separate the core of the rotator into completely independent units for which when one units fails, provided the scheduling of traffic through it ceases, the effect on traffic throughput is not significant. The method of FIG. 6 is advantageous in that the division at the output of each source ensures there are no components of the system in the data path whose failure will affect all traffic from that source other than loss of the source itself.

Figure 7:
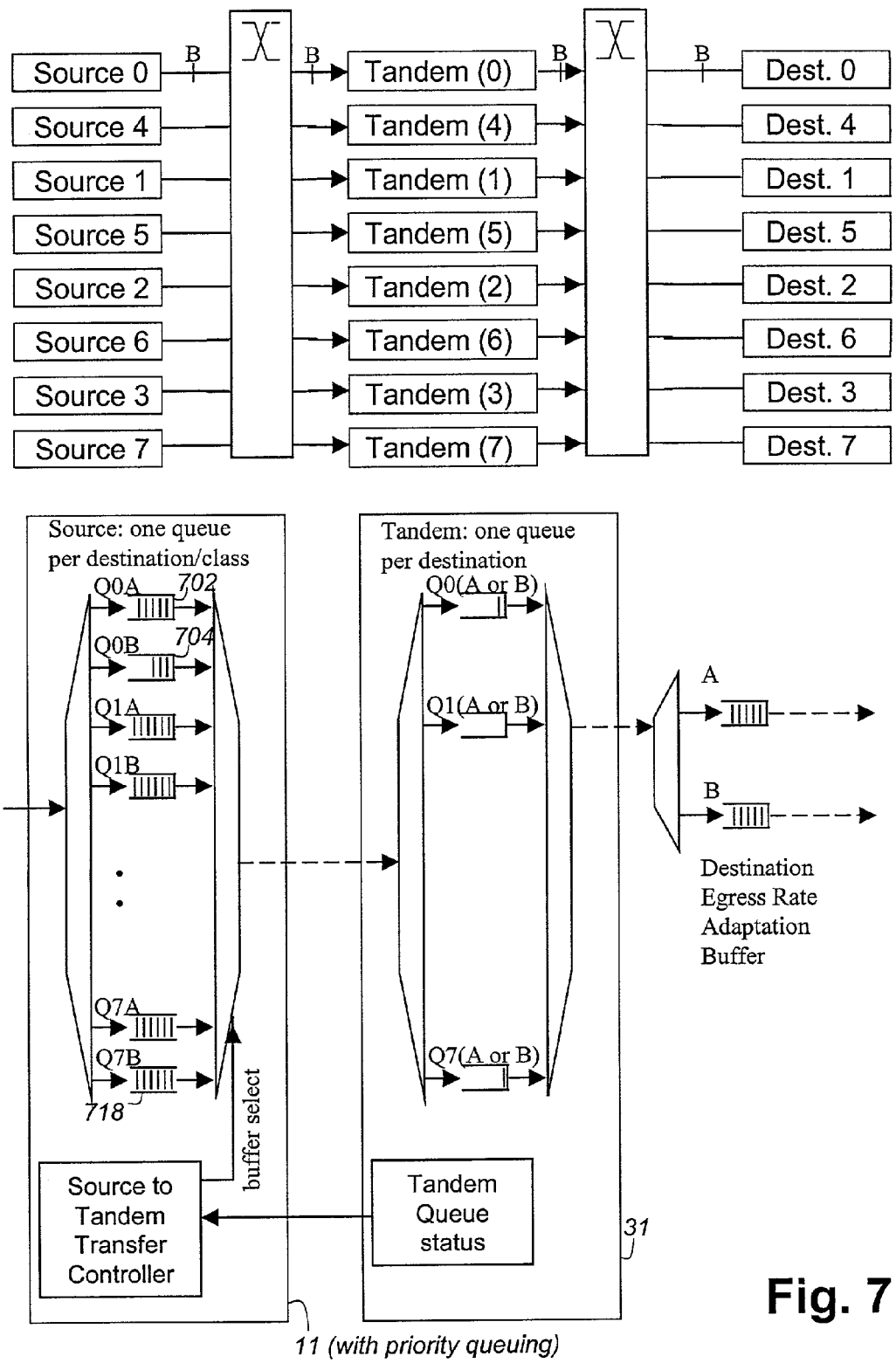
FIG. 7 illustrates a rotator switch for transferring data in information units in accordance with a sixth embodiment of the present invention including a method for queueing traffic of multiple priorities wherein only source and destination queues have distinct priority queues and the tandem queue remains as if a single priority were in use.

Referring to FIG. 7 there is illustrated a rotator switch for transferring data in information units in accordance with a sixth embodiment of the present invention. In this case each source (10, 12, 14, 16, 18, 20, 22, 24) as detailed in (11), has logical queues divided by destination and by priority such that traffic of a higher priority or class is not blocked by traffic of a lower class, a problem known as head of line blocking. Enhanced forms of known source based scheduling incorporating local or global priority can then be employed in addition to the methods of destination based queueing described in our co-pending patent as referenced above. Local priority scheduling is a development of the known matching method in which the matching of source demand per destination vs tandem availability is conducted first for the highest priority queues in the source and subsequently for lower priority queues if there is residual capacity on the tandem following potential allocation of the high capacity traffic. Thus traffic is allocated by a particular source in order of priority although the allocation is local since there is no account taken by the tandem of the state of traffic at other source nodes in the system. An improved method of source based priority scheduling is to employ a reservation system whereby in place of an immediate transfer of IU to the tandem following the successful matching of demand to availability, the status of the tandem is passed to the source and only the highest priority source demand is matched to the availability of the tandem before passing the tandem to the next source in the rotation cycle. This proceeds such that all sources are visited in turn by all tandems and grants are allocated where the match is successful one by one. This process is conducted in parallel with the rotation and data transfer process of the rotator between source and tandem and tandem and destination. After the first pass all possible reservations and corresponding grants for the highest priority traffic will have been made and the cycle is repeated for the second priority traffic and so forth. Thus each priority class is considered globally before a lower priority class such that one source with low priority traffic cannot block another source with high priority traffic as can occur with the aforementioned local method. Notice that in common with the known rotator this matching, reservation and grant function now extended to include priority can to advantage in respect of latency and reduction of information transfer, be separated into a set of functional elements dedicated to scheduling in which the data flow is equivalent comprising one of the ring controllers illustrated in FIG. 8. In combination with the double buffering this ring controller can use any permutation of source sequence to tandem matching which can be different for each rotation so as to remove bias.

Figure 8:
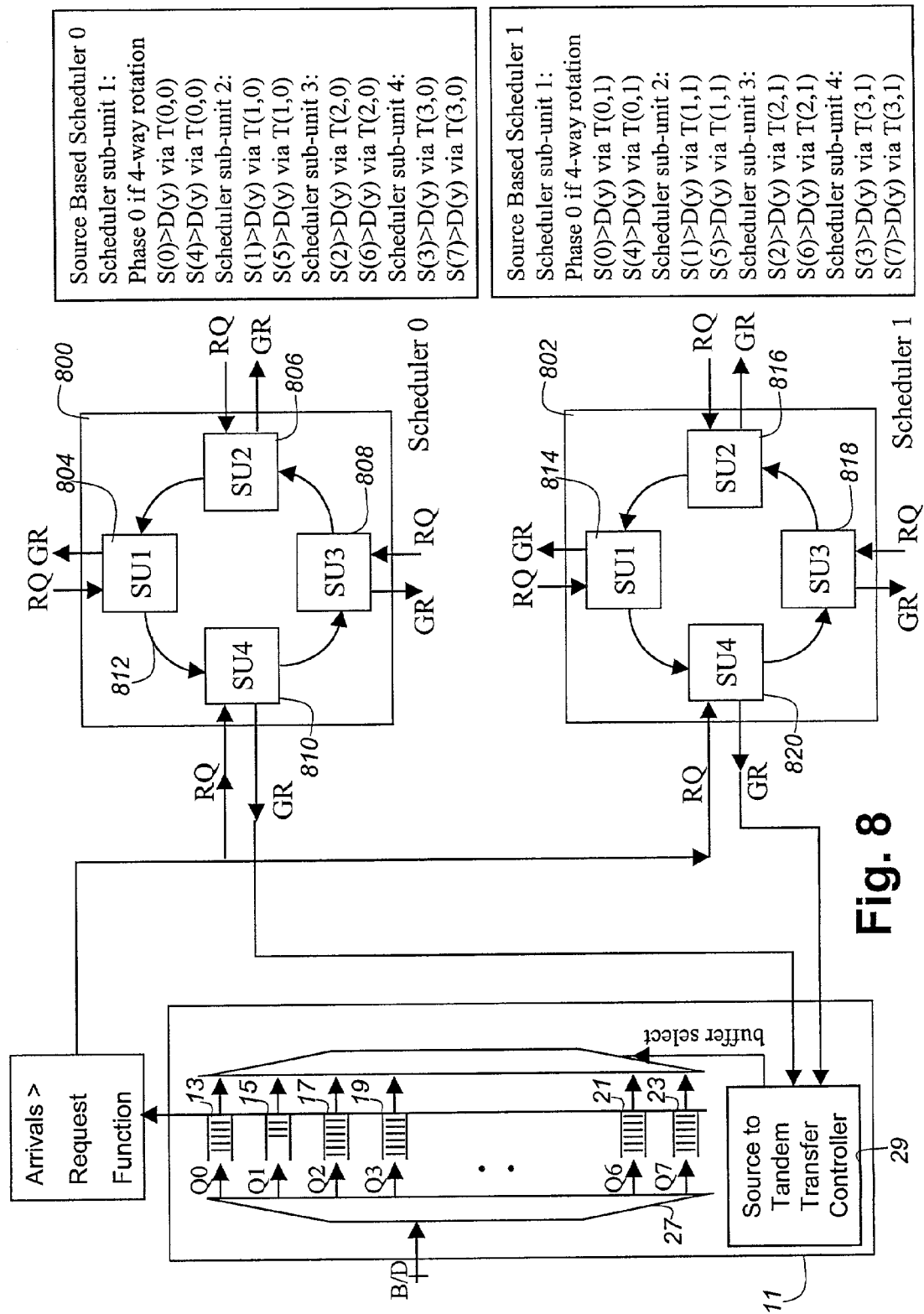
FIG. 8 illustrates a rotator switch for transferring data in information units in accordance with a seventh embodiment of the current invention including a method for load sharing between two schedulers based on distribution of grants and requests from each source node to each ring controller or scheduler.

Referring to FIG. 8, there is illustrated a seventh embodiment of the preent invention.

FIG. 8 illustrates a rotator in which there is provided a multiplicity of dedicated ring controllers or schedulers as can only exist singularly in the known rotator, and used to separate the data path and control path transactions so as to significantly reduce latency. In the present series embodiments of invention the separate scheduler is furthermore advantageous in providing firstly for global priority scheduling as described and allowing perturbation of scheduling order in accordance with degree of freedom introduced by double buffering.

The singular ring controller as in the case of the known rotator and the embodiments of the invention as described herein above is a potential single point of failure of the rotator switch. In accordance with the seventh embodiment of the invention the scheduler is split into two or more load sharing schedulers, which in their simplest embodiment can be ring controllers, such that failure of one or more units only results in the inability to schedule traffic allocated to a fraction of the total data path. Multiple load sharing schedulers of this form will be defined without loss of generality to the extended methods described herein in terms of the known rotator employing per destination queueing, and by way of example just two schedulers comprising the known ring controllers. The method is illustrated in FIG. 8, and requires a means of queueing the traffic in each source (13) by destination 13, 15, 17, 19 . . . 21, 23 as provided in the known rotator extended such that each arrival is notified to a request arrivals function which relays to one of the two schedulers (800, 802) illustrated each arrival to one or other but not both of the two scheduler sub-units (SU) 810, 820 to which it is connected by means of a link. In a system of N destinations, the information per arrival will require $\log_2 N$ bits to be conveyed to the scheduler. The decision as to which scheduler to use following a particular arrival can be based on a pseudo random selection process or using a separate round robin allocation process per destination and priority where priority implemented. The scheduler builds individual counts replicating the queue status for all destinations in a source, such that it can reproduce the known matching process of selecting to which source and destination pair to make a grant for future allocation of data transfer via the tandems associated with the scheduler. Note that the path to the scheduler may to advantage employ the data path to the tandem at which point the scheduler is attached and request and grant information is separated from the data path and fed into the scheduler. The grant follows the complementary path to the source via the complementary destination, and the grant arrives at the source to tandem transfer controller hence resulting in the dequeuing of an information unit at a predetermined time in a future rotation, said information unit being the next in the queue for that destination at that source and not necessarily or typically corresponding to that IU which arrived and resulted in the request being made, this then avoids the possibility of mis-sequencing that would otherwise occur if for each IUs resulting in a request that same IU were de-queued in strict correspondence with the grant made against the specific original request which due to the multiplicity of schedulers and different loading on schedulers would cause different request grant allocation times. The source can also operate by limiting the number of outstanding requests to any one scheduler with advantage in respect of limiting the loss in the event of failure of one scheduler and also limiting the size of counters needed in the scheduler, a more detailed description of the scheduler behaviour for destination based scheduler being defined in our copending patent referenced above.

A further advantage of this sharing of scheduler load being a reduction in the computing rate required at each scheduler which is reduced by a factor of K3given there are K3schedulers.

The methods of load sharing across rotator planes of data and scheduling by way of example in FIG. 6 and 8 can be extended to sufficient planes to provide fault tolerance in the event of failure of any single plane or element of a plane resulting in only fractional loss of the total switch fabric capacity, which can be made negligible in respect of the user traffic throughput capability by means of providing an excess fractional capacity of the data path commonly referred to as dilation between the source and destination through the rotators in comparison with the external data ingress and egress rate Additionally, in the event of failure of multiple units the loss of traffic capacity of the switch as a whole is progressive rather than catastrophic. In summary in addition to providing fault tolerance absent from the known rotator, the compound effect of the enhancements described is to improve the fairness of the rotator scheduling process under severe traffic conditions by virtue of double buffering and to allow an increase in bandwidth and reduce the total tandem memory of a practical rotator design (given a strict limit to the acceptable rotation time) by a factor given by the ratio of the tandem bandwidth to the source bandwidth which in a practical embodiment is equivalent to an order of magnitude thus allowing for example a one terabit scale switch to be built with transit delay no greater than that of a 100 Gbit/s switch employing the known rotator while employing only one tenth of the total tandem memory.

What is claimed is:

1. A switch comprising
   a first commutator cyclically connecting each source node from among a first number of source nodes to each intermediate memory device from among a second number of independent intermediate memory devices; and
   a second commutator cyclically connecting said each intermediate memory device to each output port from among a third number of second-commutator output ports;
   wherein
   at least one of said first commutator input ports is time-shared by at least two source nodes from among said first number of source nodes, said first number being determined according to the speed of said intermediate memory device relative to the speed of said source node.

2. The switch of claim 1 wherein said at least two source nodes cyclically connect to said one of said first commutator input ports.

3. The switch of claim 1 wherein said first commutator has a number of first commutator input ports equal to said second number, and a number of first commutator output ports equal to said second number, and each first commutator output port connects to a single intermediate memory device from among said intermediate memory devices.

4. The switch of claim 3 wherein said second commutator has a number of second commutator input ports equal to said second number, each second commutator input port connecting to a single intermediate memory device from among said intermediate memory devices.

5. The switch of claim 3 wherein said first number exceeds said second number.

6. The switch of claim 3 wherein said first number is a multiple of said second number.

7. The switch of claim 3 wherein said third number of second commutator output ports is equal to said second number of intermediate memory devices.

8. The switch of claim 7 wherein at least one of said second commutator output ports connects to at least two destination nodes of a plurality of destination nodes.

9. A method of switching comprising:
   determining a speed of a plurality of intermediate memory devices, and a speed of plurality of source nodes;
   multiplexing at least two source nodes into a multiplexed input;
   cyclically connecting said multiplexed input to an input port of a first commutator having a plurality of input ports;
   cyclically connecting said input port to each intermediate memory device from among said plurality of intermediate memory devices; and
   cyclically connecting said each intermediate device to output ports of a second commutator having a plurality of second commutator output ports.

10. The method of claim 9 including a further step of scheduling data transfer from each source node in said plurality of source nodes so that each intermediate memory device holds at most one data unit destined to any of said second commutator output ports.

11. A switch comprising:
    a plurality of input commutators, each input commutator associated with a respective plurality of source nodes and cyclically connecting each source node from among said respective plurality of source nodes to respective output ports of said each input commutator;
    a plurality of intermediate memory devices each connecting to an output port from each input commutator of said plurality of input commutators; and a plurality of output commutators each output commutator associated with a respective plurality of destination nodes and cyclically connecting each intermediate memory device from among said plurality of intermediate memory devices to a destination node from among said respective plurality of destination nodes associated with each of said output commutators.

12. The switch of claim 11 wherein said plurality of intermediate memory devices is time shared by said plurality of input commutators and said plurality of output commutators.

13. The switch of claim 12 wherein each of said intermediate memory devices cyclically connects to an output port of each input commutator in said plurality of input commutators.

14. The switch of claim 13 wherein each of said intermediate memory devices cyclically connects to a number of destination nodes, each associated with one of said output commutators.

15. The switch of claim 12 wherein said plurality of input commutators includes a number of commutators determined according to the speed of an intermediate memory device in said plurality of intermediate memory devices relative to the speed of a source node in said respective plurality of source nodes.

16. The switch of claim 12 wherein said plurality of output commutators includes a number of commutators determined according to the speed of an intermediate memory device in said plurality of intermediate memory devices relative to the speed of a destination node in said respective plurality of destination nodes.

17. The switch of claim 12 further including a scheduler to schedule transfer of data units from said respective plurality of source nodes associated with each input commutator in said plurality of input commutators to said intermediate memory devices.

18. The switch of claim 17 wherein each intermediate memory device in said plurality of intermediate devices holds at most one data unit destined to a specific destination node associated with any output commutator from among said plurality of output commutators.

19. The switch of claim 12 wherein each source node in said respective plurality of source nodes queues data units awaiting scheduling for transfer to said intermediate memory devices.

* * * * *